United States Patent

[11] 3,590,381

[72] Inventor Robert G. Ragsdale
Hollywood, Fla.
[21] Appl. No. 807,671
[22] Filed Mar. 17, 1969
[45] Patented June 29, 1971
[73] Assignee International Communications Corporation
Miami, Fla.

[54] DIGITAL DIFFERENTIAL ANGLE DEMODULATOR
21 Claims, 4 Drawing Figs.

[52] U.S. Cl. 325/30, 178/67, 178/88, 325/320, 328/109, 329/104
[51] Int. Cl. H03k 9/06
[50] Field of Search 178/66, 67, 88; 325/30, 45, 65, 320, 344, 349; 328/109; 329/104

[56] References Cited

UNITED STATES PATENTS

| | | | |
|---|---|---|---|
| 3,401,339 | 9/1968 | Kluever | 325/30 |
| 3,447,085 | 5/1969 | Haas | 325/320 |
| 3,525,945 | 8/1970 | Puente | 329/50 |

*Primary Examiner*—Benedict V. Safourek
*Assistant Examiner*—Kenneth W. Weinstein
*Attorney*—Jackson and Jones ABSTRACT: A digital differential angle demodulator for use in a high bit rate digital data transmission system utilizing randomly selected voice grade telephone lines is disclosed. The demodulator derives a clock signal from an information-representing phase shifted intermediate frequency modulated signal. This clock signal is employed to synchronously gate a high frequency counter output into a detector circuit which samples a precise portion of an intermediate frequency signal containing the phase shift information to be ascertained. The high speed counter is phase locked to the intermediate frequency carrier so that the zero crossing of the squared intermediate frequency signal will occur at an odd multiple of 22.5° in the phase value of the output of the binary counter. Two separate storage registers in the detector circuit receive the most significant bits of successive counter output values depending upon the phase sampled from the precise portion of the information-containing signal. A parallel adder determines the difference between successive counts, each count of which is characteristic of the information-representing phase change originally received during the interval in question. Phase locking of the high speed counter assures that random phase changes caused by system noise will not adversely affect the detection operation. An encoder converts the phase change signal as emitted by the parallel adder back to its original digital data level format.

INVENTOR.
ROBERT G. RAGSDALE
BY
Jackson & Jones
ATTORNEYS.

DIGITAL DIFFERENTIAL ANGLE DEMODULATOR

CROSS REFERENCE TO RELATED APPLICATION

This application is an improvement over a related application entitled "Digital Angle Modem," Ser. No. 709,761 filed Mar. 1, 1968 by inventors Robert G. Ragsdale, et al., and assigned to the same assignee as is the present application.

Further, this application is related to three other applications also assigned to the same assignee as the present application. Such other applications are entitled "Band Limited Telephone Line Data Communication System," Ser. No. 565,214, filed July 14, 1966 by inventor Sang Y. Whang now issued as Pat. No. 3,524,023; an application entitled "Derived Clock from Carrier Envelope," Ser. No. 709,609, filed March 1, 1968 by inventor Sang Y. Whang, et al.; and an application entitled "Equalization Circuit" filed March 1, 1968 having Ser. No. 709,608 by inventor Sang Y. Whang.

BACKGROUND OF THE INVENTION

1. Field of the Invention

The field of this invention includes communication systems for digital data and particularly includes such communication systems employing U.S. commercial and foreign telephone lines and associated telephone circuitry as randomly selected in various combinations for data transmission.

2. Description of the Prior Art

Digital data transmission over voice grade telephone lines and associated telephone circuits where the digital data is initially represented by angle modulated square wave signals is a well-known art. Prior art communication techniques have employed, at the receiver, a different phase keying demodulation technique which employs analog signal wave forms. Such analog-type systems, although suitable for many applications, are generally susceptible to errors through erroneous phase detection in that a limited number of cycles are available for comparison purposes. In addition, such analog systems are susceptible to noise and normally involve complicated and costly equipment for the large number of relatively small angle increments capable of being detected by the demodulator of the present invention.

In the aforegoing-referenced earlier filed patent application there is disclosed a novel digital differential angle demodulator capable of distinguishing between small angle increments of phase modulated square wave signals with a simplicity and accuracy not heretofore known by the prior art. The demodulator of that system utilizes a free-running, high speed multistage counter which is gated precisely at the center of an information represented interval so as to read out a count coincident with the first zero crossing of the phase shift to be ascertained. This first count is stored in a register. At the center of a subsequent information-representing interval the counter is again gated to obtain a second count coincident with the first zero crossing of the next phase shift to be ascertained. This second count is stored in a second register. A comparison of both registers yields a value indicative of the phase change which occurred between the sampling periods.

While the above technique provides excellent results in most applications, its usefulness is somewhat limited in that system noise of the magnitude of one-quarter of the minimum phase difference to be detected is capable of causing erroneous readings. That this is so may be understood from an appreciation that an absolute phase reading containing random system noise at one point time is compared with an absolute phase reading containing random system noise at a second, later point of time. If the random system noise at these two times should conjoin to additively effect the two-sample comparison operation, the system will be faced with an ambiguous difference reading resulting in a possible incorrect choice of detected phase change.

SUMMARY OF THE INVENTION

The demodulator of the instant invention overcomes this problem by phase locking the high speed counter to the intermediate frequency information signal carrier so that the zero crossing of the squared intermediate frequency signal will occur at an odd multiple of 22.5° in the phase value of the output of the binary counter. Only the three most significant counter stages representing respectively 45°, 90° and 180° are compared to find the differential phase change. Phase locking of the high speed counter is achieved by adding 2.8° or subtracting 2.8° from the counter value depending on whether the 22.5° counter stage is in a zero or one state at the sample time. By this technique each sample reading is, in effect, compared to a standard reference. The resultant reference compared readings are thereafter compared to provide the phase shift information. The instant system requires only a three most significant bit comparison technique in distinction to the prior system which required a seven bit comparison. At the same time system noise tolerance is significantly increased.

BRIEF DESCRIPTION OF THE DRAWING

The foregoing principles and features of this invention may more fully be appreciated by reference to the accompanying drawing in which.

DESCRIPTION OF THE PREFERRED EMBODIMENT

Figure 1:
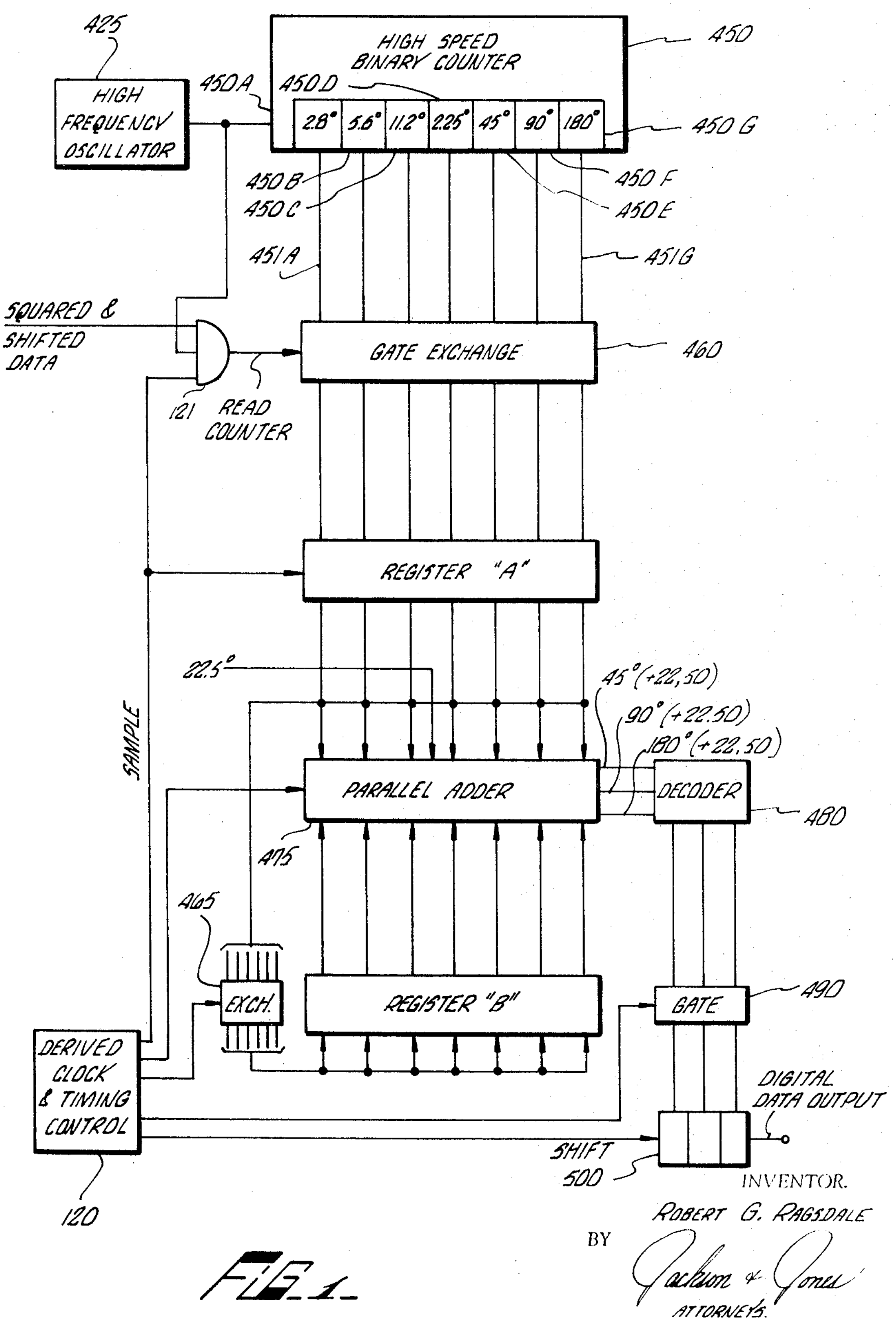
FIG. 1 is a block diagram of the phase detector incorporating the principles of the invention described and claimed in the aforegoing referenced earlier filed patent application.

Turning now to the drawings, the phase detector of the invention described and claimed in the earlier referenced patent application is disclosed in the block diagram of FIG. 1. Reference to the earlier filed application may be made if full details of the earlier claimed invention are required. Briefly, however, the block diagram of FIG. 1 depicts a phase detector capable of demodulating a square wave differential eight phase modulated signal. Such signals contain eight different phase differences of 45° each. As used in a digital data transmission system, multibit groups of digital levels may be assigned distinct phase values, and thus a detection and comparison of a given phase with a subsequent phase provides a ready demodulation scheme.

Sample gate 121 in FIG. 1 receives as an input the intermediate frequency square wave phase shifted signal to be demodulated. Gate 121 further receives a sample pulse from the data derived clock source 120 and a synchronizing pulse from a high frequency stabilized oscillator 425. The sample pulse is a precisely controlled interval and selects from the intermediate frequency information signal only that portion of the signal which contains the phase shift to be ascertained. Oscillator 425 also drives a free-running high speed binary counter 450 which includes counter stages 450A through 450G. Each stage has associated therewith the angle output in degrees shown within each of the seven stages.

The counter outputs 451A through 451G are applied to a gate exchange 460. When enabled by an output from sample gate 121, which output is essentially coincident with the first level state transition of the data pulse during the sampling period, gate exchange 460 reads the seven stage counter output into Register A.

Register B has stored therein the count received from the immediately preceding sampling period. Subsequently, an output pulse from timing control 120 enables parallel adder 475 to subtract the seven bit output count from Register B from the seven bit output count of Register A (plus a 22.5° constant offset amount which is always added to the output of Register A). The difference in counts is then supplied to decoder 480 as 0°, 45°, 90°, etc. Decoder 480 decodes the detected phase differences into any desired prearranged multibit groups of digital levels.

The above described adder operation subtracts the seven stage output count containing the inherent noise distortions as stored in Register B from the seven stage output count containing the inherent noise distortions as stored in Register A. In other words, a phase reading partly containing system noise at one point in time is subtracted from a phase reading partly containing system noise at a later point in time. There is no provision for compensating for system noise in the sense that at any two given points of time it must be assumed that the system noise levels will not be of a magnitude sufficient to effect the three most significant bits of the seven bit difference reading resulting from the operation of parallel adder 475.

The technique of phase detection employed in this invention comprises phase locking the high speed counter to the intermediate frequency carrier so that the zero crossing of the square intermediate frequency signal will occur at an odd multiple of 22.5° in the phase value of the output of the binary counter. A further feature involves two sample comparisons of only the three most significant bits representing the 45°, 90°, and 180° stages of the high speed counter.

Figure 2:
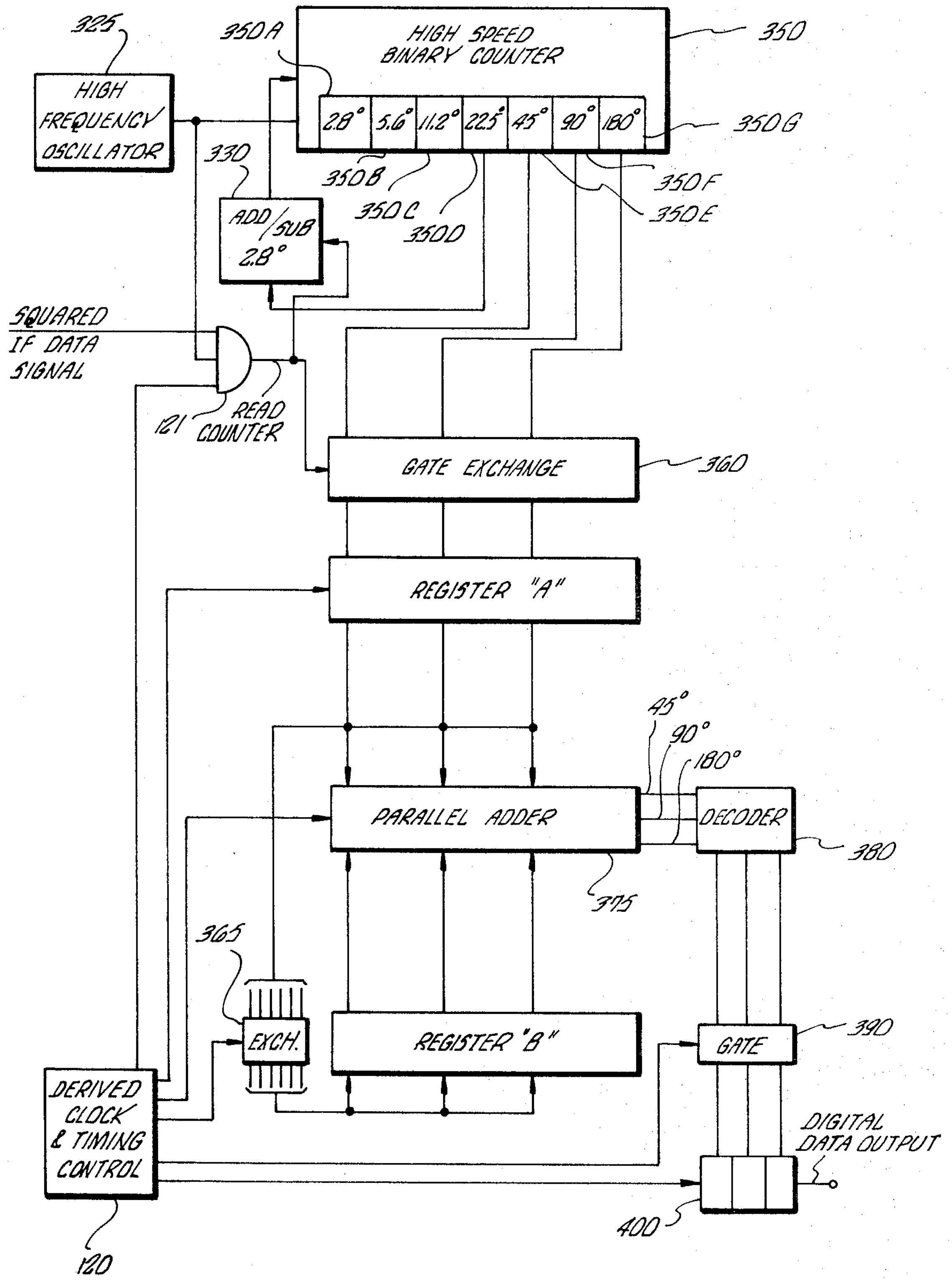
FIG. 2 is a block diagram of the phase detector incorporating the principles of this invention.

Turning now to FIG. 2, the block diagram of the improved phase detector is shown. Sample gate 121 receives as inputs the intermediate frequency phase shifted signal to be detected, a sample pulse from the data derived clock source 120 and a synchronizing pulse from high frequency stabilized oscillator 325.

Oscillator 325 derives a high speed binary counter 350 which includes counter stages 350A through 350G. Each stage has associated therewith the angle output in the degrees shown within each of the seven stages. This high speed binary counter 350 is capable of generating in succession within any one sample period, all of the angle amounts indicated in the seven stages 350A through 350G an any progressive summation thereof.

Counter 350 is phase locked to the intermediate frequency carrier so that the zero crossing of the squared intermediate frequency signal will occur at an odd multiple of 22.5° in the phase value of the output of the binary counter. The phase locking is achieved in the following manner: It is known initially that the incoming intermediate frequency data signal was modulated in increments of 45°. The counter is initialized by writing a 1 into stage 350D. This in effect initiates the counter reading at 22.5°. The value of the 22.5° stage of counter 350 is thereafter interrogated at a time coincident with the first level state transition of the data pulse during each sampling period. The interrogation is effected by a "read-counter" pulse emitted by sample gate 121. If a one appears in stage 350D add/subtract circuit 330 thereafter subtracts 2.8° from the counter reading. If a zero appears in stage 350D, add/subtract circuit 330 thereafter adds 2.8° to the counter reading.

The counter outputs 350E to 350G representing the 45°, 90°, and 180° stages are applied to a gate exchange 360. This gate exchange 360 may be any well-known gate exchange of the prior art which responds to a "read-counter" signal 650. When enabled by the output from sample gate 121, gate exchange 360 reads the counter output of the stages 350E to 350G at that instant in time and stores it in Register A, which may be any well-known storage register.

Figure 3:
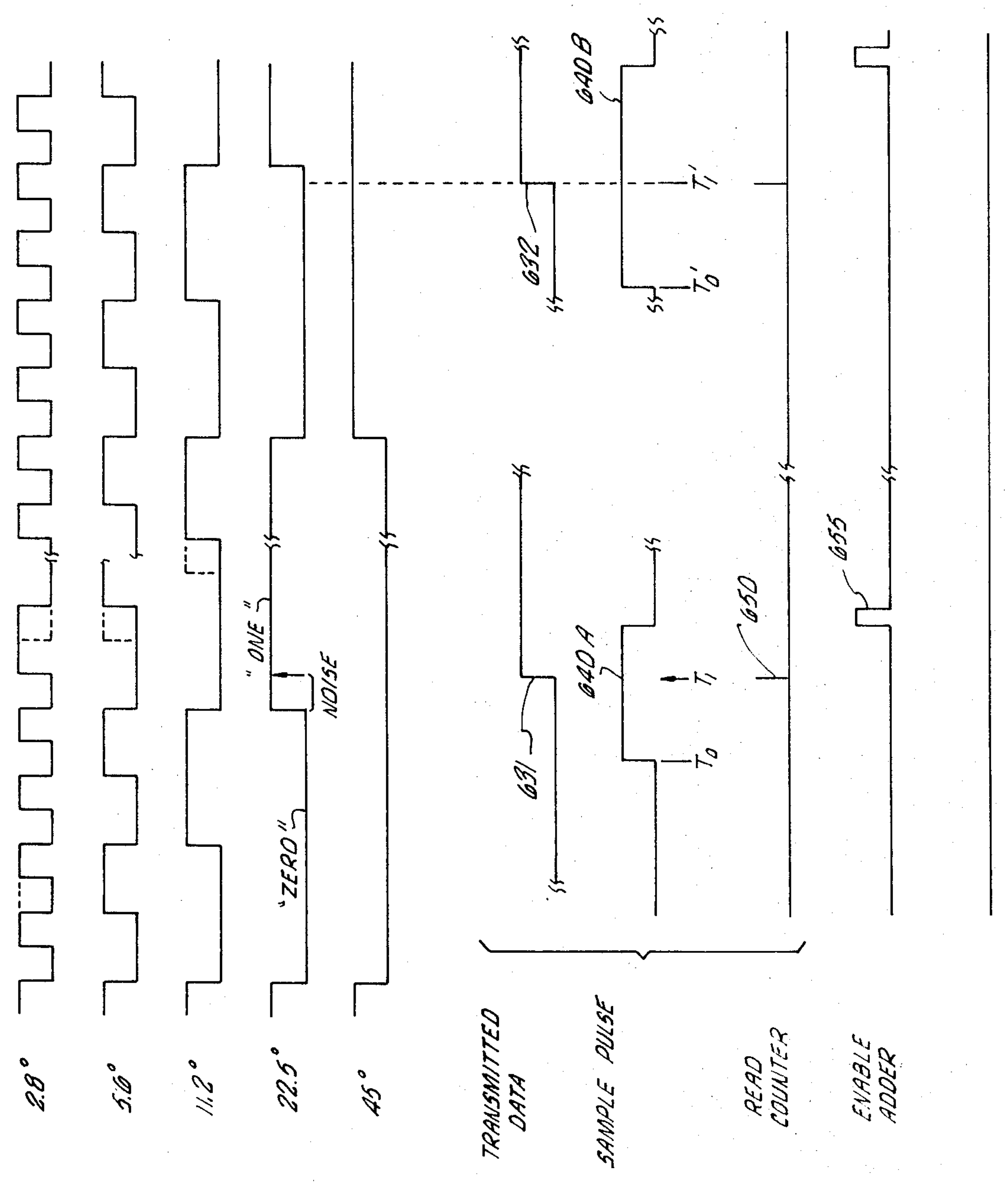
FIG. 3 is a pulse and waveform chart useful in promoting a clearer understanding of the phase detector of FIG. 2.

Reference to FIG. 3 further indicates the timing sequence for the demodulating operation of FIG. 2 in accordance with the instant invention. Shown in FIG. 3 are two phase shifted signals 631 and 632. The leading edge of a sample pulse 640A, also shown in expanded time scale, occurs at $T_o$, which sample pulse brackets, by its duration, the midpoint of a modulation period. The signal transition which appears in the data signals 631 and 632 during the sample pulse time represents a phase to be detected. At time $T_1$, the data signal 631 goes from a low to a high condition. At the next leading edge output from high frequency oscillator 325, a "read-counter" pulse 650 is emitted from gate 121 so as to enable gate exchange 360. Thus, at time $T_1$ the three most significant digit output from counter 350 is stored in Register A. At the same time "read-counter" pulse 650 enables add/subtract circuit 330. Stage 350D of the high speed counter 350 is thus selectively interrogated as to its output level by add/subtract circuit 330.

In the ideal case, that is in the case where no system noise is present, stages 350A to 350D will oscillate between subsequent sample readings of 0001 and 1110. In the presence of system noise the system will react by continually adding, at each subsequent sample time, 2.8° to the counter value if the noise-induced phase shift causes the transition of the data wave form to occur before the zero-to-one transition of the 22.5° waveform. Opposite direction noise induced phase shift will result in a continual subtraction of 2.8° until the shift has been compensated for.

In the instance shown at time $T_1$, FIG. 3, it can be seen that stage 350D has a "one" stored therein. The transition of wave form 631 has occurred slightly beyond the zero-to-one transition of the 22.5° wave form indicating a slight phase drift caused by some system disparity. For example, system noise has shifted the intermediate frequency data signal from its ideal phase position relative to the 22.5° transition. As previously explained, add/subtract circuit 330 thereafter compensates for the system noise by subtracting a "one" from the least significant bit (stage 350A) of counter 350.

At the read counter time of $T_1$ the "read-counter" pulse 650 pulses the add/subtract circuit 330. This circuit 330 has two possible outputs as will be described in more detail hereinafter. Briefly, however, circuit 330 emits an output signal to the first stage 350A of counter 350 which interrupts the normal toggling operation of that stage. Thus, as shown in FIG. 3, the 2.8° waveform is either "high" or "low" on a repetitive basis which is related to the output frequency of oscillator 325. This repetitive operation would normally result in the 2.8° output from stage 350A dropping "low" in the manner indicated in dashed lines in FIG. 3. Since the noise has advanced the phase of the data by the amount shown by the bracket labeled "Noise" at the 22.5° waveform, it is necessary to correct for such a phase shift. Subtracting a "one," in the sense that one-half a cycle for stage 350 (shown dashed) is skipped, compensates for the advance in phase induced by system noise.

Referring to modulation period two in FIG. 3, there is illustrated a waveform condition for data signal 632 wherein the system noise has affected the data signal by reducing the ideal phase value thereof. At $T_1'$ sampling gate 121 will emit a pulse to cause gate exchange 360 to read the phase value of the three most significant bits of counter 350 into Register A. It will be noted that at this point in time a zero appears in stage 350D. Add/subtract circuit 330 will thereafter add "1" to the count of stage 350A. The counter will therefore be phase locked to the intermediate frequency carrier so that the zero crossing of the I.F. squared signal will be made to occur at an odd multiple of 22.5° in the phase value of the output of the binary counter.

Figure 4:
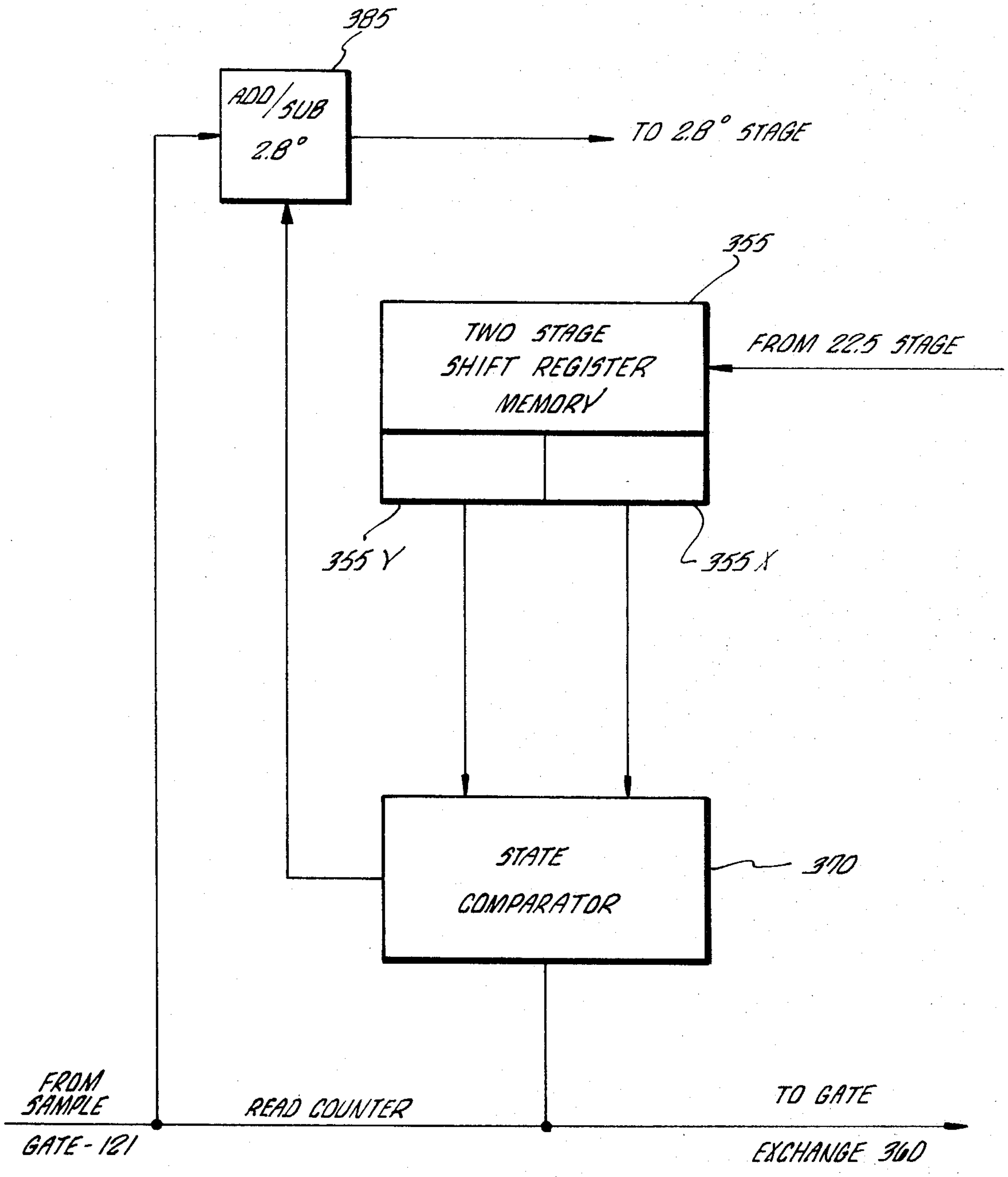
FIG. 4 is a block diagram of an alternate embodiment of the phase locking circuitry incorporating the principles of this invention.

An alternative embodiment of the phase locking technique in accordance with the instant invention is illustrated in FIG. 4. The embodiment of FIG. 4 is adapted to enable add/subtract circuit 385 to subtract or add 2.8° to counter 350 only when counter stage 350D is in either a one state during two contiguous sampling times or a zero state during two contiguous sampling times.

Referring to FIG. 4, the output from stage 350D is read into stage 355X of two stage shift register memory 355 at a sampling time $S_1$. At a sampling time $S_2$ the value of stage 350D (at $T_2$) is read into stage 355X, the value in stage 355X being shifted into stage 355Y. State comparator 370 thereafter interrogates stages 355X and 355Y. If the above stages contain a 10 or 01 combination, indicating that the 22.5° stage has changed state from low to high or high to low during the time $S_1$–$S_2$, add/subtract circuit 385 is not enabled. If, however, stages 355X and 355Y contain two "ones", state comparator 370 enables add/subtract circuit 385 to subtract 2.8° to the counter value at the next sample time. If the above stages contain two "zeros," state comparator 370 enables add/subtract circuit 385 to thereafter add 2.8° to the counter value during the subsequent sampling time.

Returning now to the description of FIG. 2, subsequent to the times $T_1$ etc. in each sampling period, an output pulse from timing control 120 enables the parallel adder 375 to perform a well-known parallel adder operation subtracting the output count from Register B (which has stored therein an output count from an immediately preceding sampling period) from the output count of Register A. The difference in counts is then supplied to a decoder 380 as 0°, 45°, 90°, etc. The adder outputs are decoded in decoder 380 in the manner as described in the aforementioned reference patent application. Upon command from the timing control of source 120, gate 490 is enabled by an enabling pulse storing the output of decoder 380 in three stage shift register 400. A shift signal thereafter converts the parallel data stored in Register 500 back to its original series data output.

After the decoder output has been read, timing control 120 delivers a transfer "A" to "B" pulse to gate exchange 365 which serves to place the count from Register A into Register B where it will be available for a subsequent comparison with the next data sample taken in accordance with the foregoing described operation which is repeated for each modulation period.

While the invention has been described with respect to a physical embodiment constructed in accordance therewith, it will be apparent to those skilled in the art that various modifications and improvements may be made without departing from the scope and spirit of the invention. For example, the invention may readily be modified to demodulate information signals which have been phase modulated in increments other than 45° by simply changing the values of the counter stages. More generally, in a system wherein the data is phase modulated in increments of 360/N degrees, the high speed counter is phase locked, in the manner described, so that the phase representing state change of the squared intermediate frequency data signal will occur at an odd multiple of 360/2N degrees in the phase value of the output of the binary counter ($360/2N\Phi\upsilon_M 360/N$, where M is 0,1,2,3.....). Accordingly, it is to be understood that the invention is not to be limited by the specific illustrative embodiments but only by the scope of the appended claims.

What I claim is

1. In a data transmission system for sending digital data between a transmitter and a receiver over a transmitting link by establishing predetermined multiples of a given phase amount in a carrier signal during successive modulation periods representative of preselected data combinations, the modulated carrier signal being converted at the receiver to a high frequency signal having the same phase relationship between adjacent modulation periods as the modulated carrier signal, a demodulator at the receiver for detecting said phase differences which comprises:
   - counting means for producing a counter output signal having one portion indicative of multiples of said predetermined phase differences and another portion variable about a signal value indicative of a phase amount less than said given phase amount;
   - comparing means responsive to the high frequency signal during a preselected portion of each modulation period for comparing said one portion of the output signal from the counting means obtained during one modulation period with said one portion obtained during an adjacent modulation period to provide an output signal representative of the phase difference multiple between the modulated high frequency signal present during said adjacent modulation periods; and
   - means responsive to said variable portion of said counter output signal for synchronizing a preselected portion of said high frequency signal with said counter output value.

2. The demodulator as defined in claim 1 wherein said synchronizing means comprises means for selectively advancing or retarding said counting means to vary the variable portion of the output signal of said counting means.

3. The demodulator as defined in claim 2 wherein the signal value of said variable portion corresponds to odd multiples of one-half of said given phase difference amount.

4. The demodulator of claim 3 wherein the counting means is a high speed binary counter having a plurality of output stages each capable of assuming a first or second state and at least one stage of which corresponds to a phase value representing one-half of said given phase difference amount when said stage is in said first state.

5. The demodulator of claim 4 wherein the synchronizing means comprises a phase locked loop having:
   - sensing means responsive to the phase of the high frequency signal during the preselected portion of each modulation period for providing an output signal indicative of the state of said at least one stage; and
   - means responsive to the output signal of said sensing means for selectively advancing or retarding said high speed binary counter whereby the state of said at least one stage varies from said first to said second state to maintain synchronism with the phase of the high frequency signal.

6. The demodulator of Claim 5 wherein the comparing means comprises:
   - a first binary signal storage register;
   - a second binary signal storage register;
   - a parallel adder for signals from said first and second registers;
   - means for applying to said first storage register, from the most significant stages of the binary counter, said one portion of the counter output signal in response to the phase of the high frequency signal appearing during the preselected portion of one modulation period;
   - means for transferring the signal in said first storage register to the second storage register before said signal applying means stores said one portion of the counter output signal in said first register during the next upcoming modulation period; and
   - means for applying the signals stored in said first and second storage registers to said parallel adder to obtain an adder output representative of the phase difference between the signals from said first and said second storage registers.

7. In a data transmission system for sending digital data between a transmitter and a receiver over a transmission link by establishing phase differences of 360/N degrees (where N is a number greater than one) in a carrier signal during successive modulation periods representative of preselected data combinations, the modulated carrier signal being converted at the receiver to a high frequency signal having phase relationships between adjacent modulation periods related to the carrier signal phase relationships, a demodulator at the receiver for detecting the phase differences which comprises:
   - means at the receiver responsive to the envelope of the carrier signal for deriving a clock signal in synchronism with the modulation periods of the carrier signal;
   - means at the receiver responsive to the clock signal for generating a sample signal at substantially the center of each modulation period;
   - counting means at the receiver for producing an output signal which includes a first and second portion, the first portion indicating multiples of 360/N degrees and said second portion being variable about an angular amount that is related to said 360/N degrees;
   - comparing means at the receiver responsive to the high frequency signal and to the sample signal for comparing the first portions of the output signal of the counting means during successive modulation periods, said comparing means emitting an output signal which is a measure of the phase difference between compared signals; and means responsive to the second portion of the output signal of said counting means during each modulation period for phase locking the high frequency signal to said related angular amount of said second portion of output signal of said counting means.

8. The demodulator as defined in claim 7 wherein the related angular amount corresponds to odd multiples of 360/2N degrees.

9. The demodulator as defined in claim 8 wherein said phase locking means comprises means for selectively advancing or retarding the second portion of the output signal of said counting means as a function of the relation of the time of occurrence of the high frequency signal with the presence or absence of said related angular amount from said counting means.

10. The demodulator of claim 8 wherein N is equal to eight.

11. A data transmission system having a transmitting and receiving device connectable together by a signal transmission link, said system comprising:

means at the transmitting device for generating a carrier signal having predetermined multiples of a given phase difference during successive modulation periods;

a demodulator at the receiving device for sampling the phase of the received signal at a predetermined portion of each successive modulation period;

means at the receiver associated with said demodulator for emitting a reference signal having a plurality of predetermined phase values with one output phase being half of the phase difference utilized at said transmitting device; and phase locking means connected between said signal generator and said demodulator whereby said data containing portion of said received carrier signal is locked to an odd multiple of the value of said one output phase.

12. The system of claim 11 wherein said phase locking means comprises means for selectively advancing or retarding said reference signal in response to a preselected number of said sampled phases.

13. A method of demodulating a modulated carrier signal having predetermined multiples of a given phase difference during successive modulation periods comprising the steps of:

sampling said carrier signal at preselected portions of each successive modulation period;

obtaining a timing pulse coincident with the phase present during the sampled portion;

generating at a fixed repetition rate and output signal having a first plurality of phase values less than the given phase difference and a second plurality of phase values of multiples of said given phase difference;

comparing under control of the timing pulses from two adjacent modulation periods the phase values from said second plurality of phase values; and locking the phase present in said preselected portions to one phase value from said first plurality of phase values.

14. A method in accordance with claim 13 further defined in that said step of locking the signals comprises:

locking the phase present in said preselected portions to a phase value representing an odd multiple of one half the given phase difference.

15. A method of transmitting data represented by preselected phase values in a carrier wave comprising the steps of:

generating a carrier signal having predetermined phase differences during successive modulation periods;

transmitting said carrier signal to a receiver;

sampling the transmitted wave at the receiver at a predetermined portion of each successive modulation period;

generating a reference signal having a plurality of predetermined phase values with one selected phase value as a reference phase;

comparing said sampled portions with said reference signal to determine the phase value of each sampled portion; and locking the signals in the preselected portions to said selected reference phase of the reference signal.

16 A method in accordance with claim 13 further defined in that said step of locking the signals comprises:

locking the signals in said preselected portion to reference signals approximately representing odd multiples of one half the minimum difference of the preselected phase values.

17. In a data transmission system for sending digital data between a transmitter and receiver over a transmission link wherein the digital data is represented by a carrier signal which is differentially phase modulated by predetermined multiples of a given angular amount during successive modulation periods in accordance with information to be transmitted, a demodulator at the receiver which comprises:

a pulse counter driven at a fixed repetition rate and having a readout signal with certain portions of the signal being indicative of various multiples of said given phase angular amount and having another portion thereof being indicative of a phase angular amount other than said given angular amount, said counter including means responsive to a counter varying signal for altering said other signal portion and thus the phase of said other phase angular amount represented thereby;

means for generating a sample signal during a precise portion of each successive modulation period, which portions each coincide with the phase of the carrier that represents the phase modulated information to be sampled during such modulation periods; and signal applying means connected between said counter varying means and responsive to said other signal portion for phase locking the carrier signal occurring during said precise portions with said other phase angular amount of the signal from said counting means.

18. A demodulator in accordance with claim 17 wherein said other signal portion of said counting means includes:

a plurality of increasing predetermined angular amounts which sum together to total said given angular amount; and wherein said signal applying means includes:

means connected to monitor one of said plurality of angular amounts as a reference for phase locking the carrier signal to the monitored one of said angular amounts.

19. A demodulator in accordance with claim 18 wherein the monitored angular amount is substantially one-half the given phase difference and wherein said signal applying means includes means for either adding or subtracting pulses from said counting means during every modulation period.

20. A demodulator in accordance with claim 19 wherein said signal adding and/or subtracting means is only operative following the repeated presence and/or repeated absence of said monitored angular amount during a given number of successive modulation periods.

21. In a system wherein digital data is represented by a carrier signal which is differentially phase modulated by multiples of a predetermined angular amount during successive modulation periods, a demodulator comprising:

counting means for producing an output signal having a first portion indicative of multiples of said predetermined angular amount, and a second portion indicative of an angular amount less than said predetermined angular amount, said counting means being variable for varying said second portion of said output signal about said lesser phase amount;

means responsive to receipt of the carrier signal for generating a sample signal during each modulation period;

comparing means responsive to the phase of the modulated carrier signal and to the sample signal for comparing the first portion of said output signal of the counting means during successive modulation periods to provide an output signal which is a measure of the phase difference between the modulated signals occurring at adjacent modulation periods; and means responsive to the second portion of said output signal of said counting means and to the phase of said carrier during the presence of said sample signal for varying said counting means into phase locking relation between said carrier signal and said lesser angular amount.

UNITED STATES PATENT OFFICE
CERTIFICATE OF CORRECTION

Patent No. 3,590,381 Dated June 29, 1971

Inventor(s) Robert G. Ragsdale

It is certified that error appears in the above-identified patent and that said Letters Patent are hereby corrected as shown below:

Column 1, Line 35, "different" should be ---differential---.

Column 1, Line 69, after point, insert ---in---.

Column 5, Line 46, "(360/2N$\phi v_m$360/N," should be

---(360/2N + M360/N,---

Signed and sealed this 11th day of January 1972.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O—366-334